April 28, 1931.  A. D. ROSS  1,803,135

WELDING APPARATUS

Filed March 2, 1929

INVENTOR
ALEXANDER.D.ROSS
BY Fetherstonhaugh & Co
ATTORNEYS

Patented Apr. 28, 1931

1,803,135

UNITED STATES PATENT OFFICE

ALEXANDER D. ROSS, OF MONTREAL, QUEBEC, CANADA

WELDING APPARATUS

Application filed March 2, 1929, Serial No. 343,883, and in Canada November 22, 1928.

This invention relates to new and useful improvements in welding apparatus and to an apparatus for welding or jointing cables, pipes and the like and the object of the invention is to provide an efficient apparatus which will melt low vaporizing metal to form a joint between the adjacent ends of the material to be joined.

Another object is to provide an apparatus in which the radiation and convection losses are low and the size of the apparatus small so that it may be easily handled.

According to this invention, a welding apparatus is provided involving the use of an exothermic substance, such as a mixture of aluminum, iron oxide, magnesium and potassium nitrate. It is well known that the reaction of a mixture of this character produces a very high temperature and that the generated heat is nearly all contained in the molten metal or iron formed as a product of the reaction. The volume of the iron and metal is small but its temperature is very high.

The best method of removing this heat is by conduction through a metal or metals. If this molten metal is placed in the interior of the metal to be melted instead of on the exterior, the heat will be transferred by conduction and the efficiency will be higher as the molten iron is surrounded by the metal. In my apparatus I provide a container lined with a refractory material. A cup containing the exothermic mixture and surrounded by the metal or alloy to be melted is placed within the container. A cover is provided for the container and means are provided for igniting the mixture and also for allowing the gases generated within the container to escape. Means are also provided in the bottom of the container to hold the metal therein until it is at the most suitable temperature for pouring to form a welded or soldered joint between the ends of the material to be joined.

In the drawings which illustrate one form of my invention:

Figure 1:
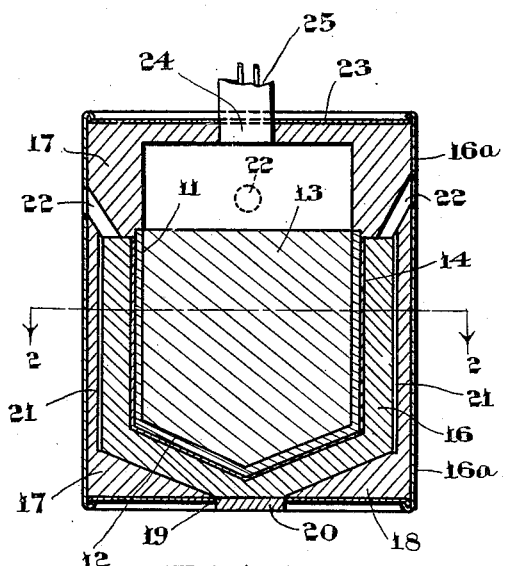
Figure 1 is a sectional side elevation of my improved welding apparatus which is made in cartridge form.

Referring more particularly to the drawing, 11 designates an iron cup the bottom 12 of which is preferably of inverted conical form. The interior of the cup is filled, as indicated at 13, with an exothermic, heat generating mixture of the character previously referred to. The outer wall of the cup is covered with a thin layer 14 of refractory material. The alloy or metal 16 to be cast or melted is poured around the cup and moulded into proper shape. When the metal solidifies, it shrinks very tightly around the refractory layer and cup and a firm contact is made between the metal and the cup. The metal and cup are then placed in a container 16a which is provided with a thin lining 17 of refractory material. The base 18 of the lining is preferably made of inverted conical form and an aperture 19 is formed in the centre of the bottom or base of the container and the lining. The inverted conical base assists the metal in its flow and directs it towards the aperture. The aperture is filled with a fusible metallic plug 20 and this plug is preferably made of a metal having a slightly higher melting point than that of the alloy, to ensure that the said alloy is in a fit state for pouring before the plug melts. It is preferable to allow an air space 21 between the inner wall of the refractory lining 17 and the outer wall of the cast fusible alloy to facilitate the flow of metal through the aperture. Air vents 22 are also provided above the metal alloy through the lining 17 and the walls of the container. A refractory or refractory lined cover 23 is secured to the top of the container and this cover is provided with an aperture 24 centrally disposed above the charge 13 to allow for the insertion of an igniter 25. This igniter may be secured to the exothermic charge 13 and projects through the aperture 24. This aperture also has the function of allowing gases, generated by the reaction of exothermic mixture 13, to escape without causing undue pressure on the cover.

Figure 3:
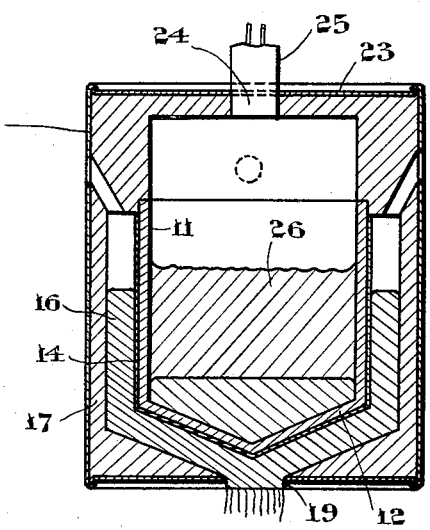
Figure 3 is a sectional side elevation of the apparatus showing the action of the metal as it is being poured from the cartridge.
Figure 2:
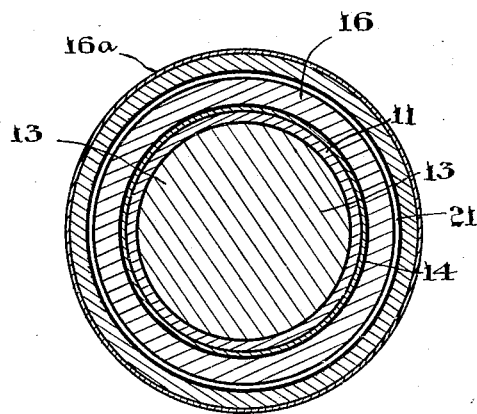
Figure 2 is a sectional plan view of the cartridge shown in Figure 1 and taken on the line 2—2.
Figure 4:
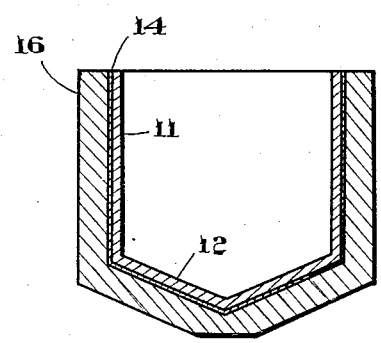
Figure 4 is a sectional side elevation of the container for the exothermic mixture with the metal or alloy to be melted attached thereto.

In operation when the charge of exothermic mixture 13 is used, the products of reaction are found as shown in Figure 3. The iron designated 26 is contained in the cup and this is covered with aluminum oxide. As the metal is in very close contact with the cup the heat is transferred rapidly into the alloy and the iron cup is prevented from reaching a molten state. This prevents the iron cup from being destroyed. At the same time, the heat is transferred so rapidly through the metal and away from the iron cup, that excessive temperatures in the metal is prevented and the tendency to vapourize the metal is also prevented. The alloy first becomes molten after which the temperature continues to rise until the fusible plug is melted. By this time the iron contained in the cup is solidified and the molten alloy is free to run through the aperture in the base of the container. The aperture may be positioned above a mould (not shown) to direct the metal around the objects to be welded or soldered together. It will be noticed that the size of the cartridge is small compared with any other device of this class so that storage and shipping charges are lower. The efficiency of the device is very high and the radiation and convection losses are low owing to the fact that the area of the unit is small. The device is very easily handled and provides a very simple apparatus which may be used in very little space and with the minimum amount of labour for joining, welding or soldering the ends of pipes, cables or the like, together.

Having thus described my invention, what I claim is:

1. In a welding apparatus, a cup adapted to contain an exothermic charge, said cup having a layer of refractory material on the outside thereof, and a moulded block of joining material surrounding the cup and making firm contact with said layer of refractory material.

2. In a welding apparatus, a cup having an exterior layer of refractory material, said cup being adapted to contain a charge of exothermic material, a block of fusible metal closely surrounding the outer wall of the cup and a container adapted to receive the cup and block.

3. In a welding apparatus, a cup having an exterior layer of refractory material, said cup being adapted to contain an exothermic charge, a block of fusible metal surrounding the cup, a container having an interior covering of refractory material, said container having an outlet for the metal and being tapered towards the outlet to cause the metal to flow towards same when in a molten state.

4. In a welding apparatus, a cup having a conical bottom and a thin exterior covering of refractory material, a moulded block of fusible metal in firm contact with the refractory material, a container adapted to receive the cup and the moulded metal, said container having a refractory lining the bottom of which is in the form of a cone tapering towards an outlet in the container bottom, a fusible plug in said outlet, said plug having a higher melting point than the fusible metal.

5. A welding apparatus according to claim 4 having a cap adapted to seal the cup and means formed in the walls of the container to allow gases from the molten metal to pass therethrough.

6. In a welding apparatus a cup having a thin exterior coating of refractory material, said cup being adapted to contain a charge of an exothermic mixture, a block of fusible metal, surrounding said cup and in firm contact with the refractory material, a container having an interior lining of refractory material, and adapted to receive the cup with the fusible metal attached thereto, said container having a frusto conical interior base adapted to direct the metal when in a molten state towards an outlet, a fusible plug in said outlet, said plug having a higher melting point than the fusible metal, a cap adapted to seal the cup, means formed in the wall of the container to allow gases formed during the melting of the alloy to pass therethrough, and an igniter in the cup for effecting ignition of the exothermic mixture.

7. Welding apparatus comprising a container having a body of heat generating material placed therein, a fusible alloy surrounding the outer and bottom surfaces of said container and carried thereby, and an outer casing surrounding said container and fusible alloy and provided with a normally closed opening through which the fusible alloy is permitted to escape, when heated to a molten condition by ignition of said heat generating material.

8. Welding apparatus comprising inner and outer containers, a fusible alloy surrounding the side and bottom walls of the inner container and enclosed by the outer container, and a body of heat generating material contained within said inner container, said outer container having a normally closed opening through which the fusible alloy is permitted to flow, when melted by ignition of the heat generating material.

In witness whereof, I have hereunto set my hand.

ALEXANDER D. ROSS.